United States Patent [19]

Ricards

[11] Patent Number: 4,527,212
[45] Date of Patent: Jul. 2, 1985

[54] MAGNETIC SHIELD AND MULTITRACK MAGNETIC HEAD APPARATUS USING SAME

[75] Inventor: John D. Ricards, Del Mar, Calif.

[73] Assignee: Eastman Kodak Company, Rochester, N.Y.

[21] Appl. No.: 364,171

[22] Filed: Apr. 1, 1982

[51] Int. Cl.³ .............................. G11B 5/10; G11B 5/12
[52] U.S. Cl. ..................................... 360/121; 360/129; 360/122
[58] Field of Search ............... 360/129, 123, 124, 122, 360/121

[56] References Cited

U.S. PATENT DOCUMENTS

| 3,663,765 | 5/1972 | Schneider | 360/122 |
| 3,863,268 | 1/1975 | Ikeda | 360/121 |
| 4,291,354 | 9/1981 | Chase | 360/121 |

FOREIGN PATENT DOCUMENTS

| 55-87316 | 7/1980 | Japan | 360/129 |
| 2063720 | 6/1981 | United Kingdom | 360/122 |

OTHER PUBLICATIONS

The Complete Handbook of Magnetic Recording, by F. Jorgensen, FIG. 7–44, p. 155, published by Tab Books, Inc.

*Primary Examiner*—Robert L. Richardson
*Attorney, Agent, or Firm*—Robert F. Cody

[57] ABSTRACT

To reconcile a variety of problems associated with multitrack magnetic heads, modified shields therefor were fabricated. Each such shield is comprised of a plurality of laminations of magnetically, and mechanically, soft material bonded together into a unitary stack of appropriate thickness. The laminations are typically of $\mu$-metal; and the stacked laminations are preferably provided with copper cladding as is the practice in the art. At the medium bearing surface of the shield, a cutout is provided; and into such cutout a small insert of magnetically soft, mechanically hard, material, e.g. Sendust, is provided.

2 Claims, 10 Drawing Figures

MAGNETIC SHIELD AND MULTITRACK MAGNETIC HEAD APPARATUS USING SAME

BACKGROUND OF THE INVENTION (1) Field of the Invention

This invention relates in general to multitrack magnetic heads and in particular to improvements thereto.

The invention, as well as the prior art, will be described with reference to the figures, of which FIG. 1 is a perspective view of a prior art multitrack magnetic head over which the invention provides improvement;

(2) Description Relative to the Prior Art

Figures 1, 2:
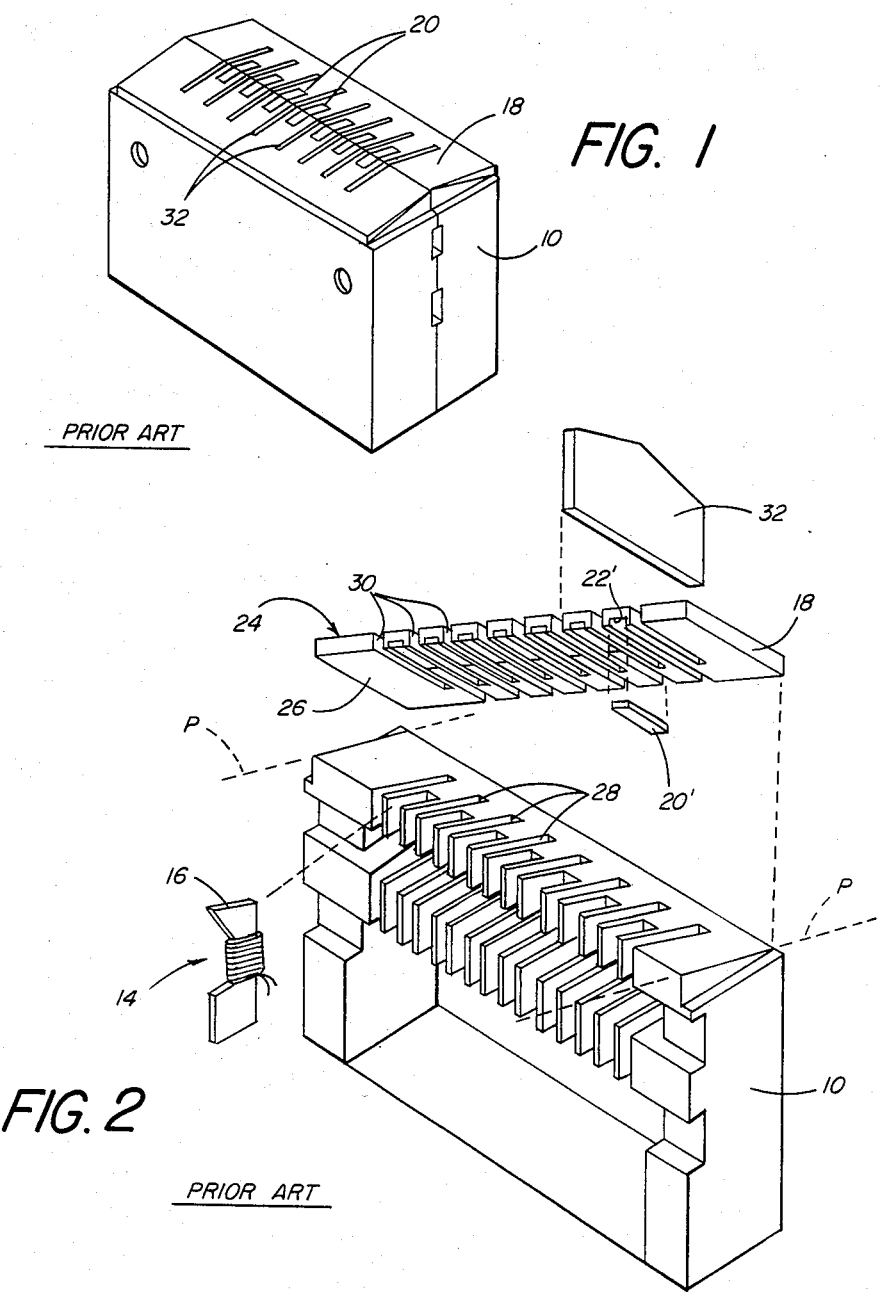
FIG. 2 is a perspective exploded view of a half bracket assembly employed in the head of FIG. 1.

British Patent Application No. 2,063,720, published June 10, 1981, discloses what is purported to be a multitrack magnetic head having improved life. The magnetic head of British Patent Application No. 2,063,720, which is indicated in FIGS. 1 and 2 hereof, is comprised of first and second half bracket assemblies 10. Each half bracket assembly is provided with slots 12 for so supporting coil-wound half cores 14 that the surfaces 16 of the cores 14 lie in the plane P—P of the half bracket assembly 10. A tip plate 18, typically of aluminum, and supporting mechanically hard, but magnetically soft, pole tips 20 in slots 22 of the tip plate, is so secured to the half bracket assembly that the pole tips 20 are in contact with the surfaces 16 of the cores. By contouring through the tip plate surface 24, the pole tips 20 are exposed, whereby they may contact a recording medium for recording and/or playing back information signals.

In an attempt to increase the wear life of the head of FIGS. 1, 2, British Patent Application No. 2,063,720 teaches the hard anodizing of, and into, the surface 26 of the tip plate 18. Therefore, when the tip plate is contoured "through" to expose the pole tips 20, the anodized part of the tip plate 18 is also exposed. Thus, so the argument goes, with hard pole tips supported in slots provided within a hard anodized tip plate, the life of the head in question will increase.

Figure 3:
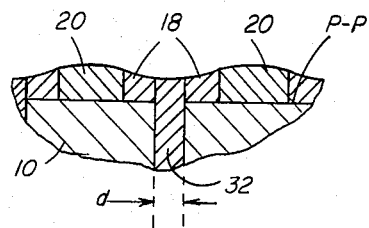
FIG. 3 is a side sectional view of part of a still earlier prior art head improved upon by the prior art head of FIGS. 1, 2.

Between each of the cores 14—in bracket assembly slots 28, and in tip plate slots 30—shields 32 are supported. The shields, per British Patent Application No. 2,063,720, and as is typical of the prior art, are "constructed of thin sheets (laminations) of copper sandwiched between layers of $\mu$-metal. The particular design of a given head dictates the number of laminations used". Irrespective of what British Patent Application No. 2,063,720 says about the number of laminations being variable, however, it is (or should be) quite clear that the shields of British Patent Application No. 2,063,720 should be as thin as possible in order to take advantage of the "long wear" characteristics of the hard anodized tip plate. In the event the shields are thick (and wide), they (and not the hard anodized surface of the tip plate 18) will be the principal support for the cooperating recording medium; and, since the $\mu$-metal and copper which comprise the shields are both mechanically relatively soft materials the desired head long life will not occur. To attain desired long life, therefore, it is incumbent in a head according to British Patent Application No. 2,063,720 that the shields be as thin as possible. In that way, the hardened tip plate will be the primary support for the recording medium. To emphasize this point, reference should be had to FIG. 3 which was taken from British Patent Application No. 2,063,720. FIG. 3 demonstrates how, without the anodizing technique of British Patent Application No. 2,063,720, the pole tips 20 round as a result of head wear, the principal points of wear, however, being the tin plate 18 and the shield 32. Consider therefore that the medium-bearing surface of the tip plate 18 has, per British Patent Application No. 2,063,720, been hard anodized: Clearly then, by keeping the thickness dimension d of the shield 32 as small as possible, the purported benefit of the hard anodizing of the tip plate will occur. To widen the shield 32 dimension d has the result of nullifying the effect of the tip plate hard anodizing.

Figure 4:
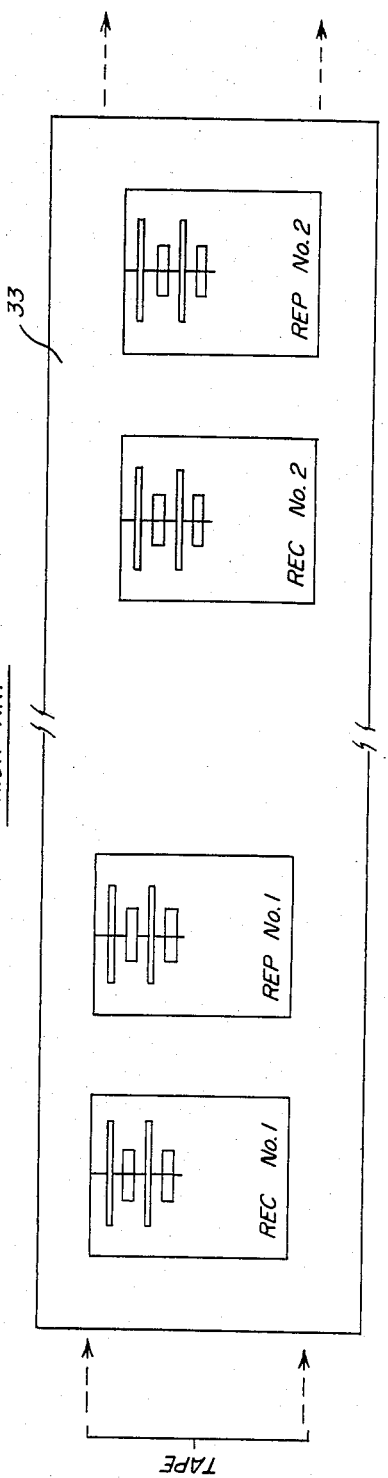
FIG. 4 is a plan view of a prior art magnetic head assembly employing pairs of interleaved record and reproduce heads.

In a typical prior art utilization of multitrack magnetic heads (FIG. 4), a pair of record heads with their tracks interleaved, and a pair of reproduce heads with their tracks interleaved, are supported, say, on a common plate 33; such interleaving has the effect of increasing the density of tracks on the recording medium in question. Thus, the 7-track head of British Patent Application No. 2,063,720 is, in a typical utilization thereof, paired with another such head to effect the recording of 14 information recording tracks; and a pair of 7-track similar such reproduce heads are likewise interleaved to recover information recorded in such 14 information tracks.

Figure 9:
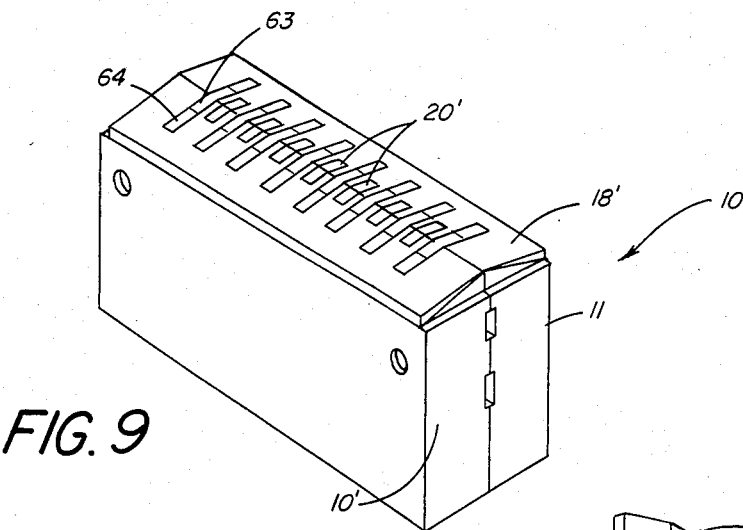
FIG. 9 is a view, like that of FIG. 3, illustrating a head incorporating shields according to the invention.
Figure 8:
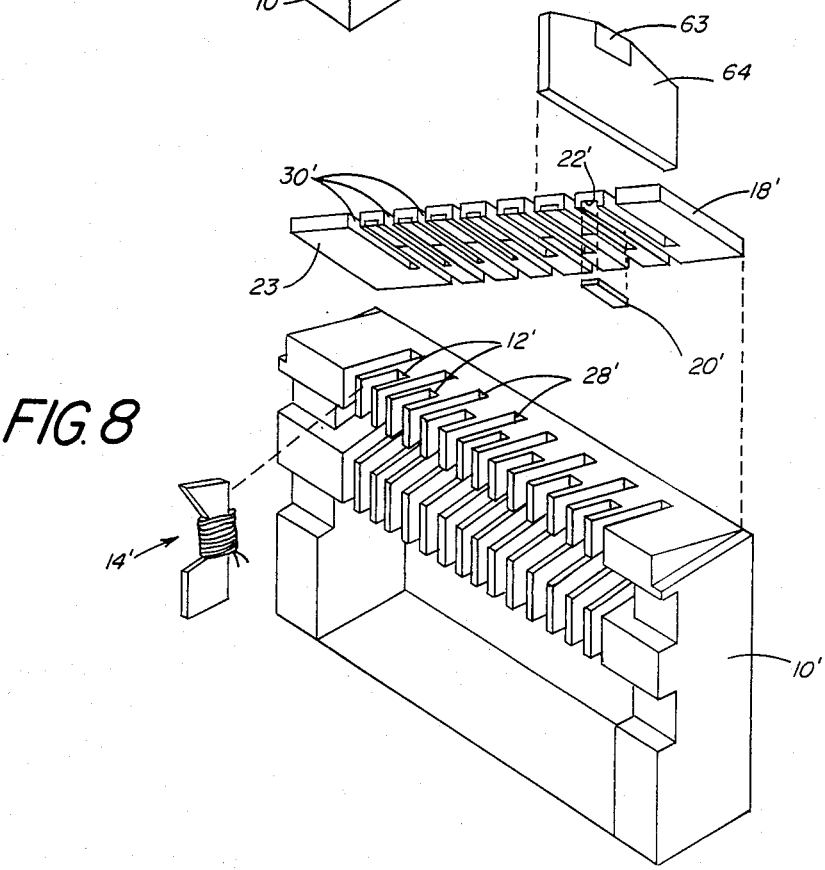
FIG. 8 is a perspective exploded view of a half bracket assembly employed in a magnetic head according to the invention.

In FIG. 1, as well as in FIG. 9, of British Patent Application No. 2,063,720, the shields of the heads depicted therein are decidedly narrower than the track-defining pole tips of such heads. Indeed, in the 4-head assembly appearing in FIG. 7-44, page 155 of *The Complete Handbook of MAGNETIC RECORDING* by F. Jorgensen, published by Tab Books, Inc., the four 7-track multitrack heads depicted therein (which are those of the assignee of British Patent Application No. 2,063,720) all have between-track shields which are markedly narrower than their respective track-defining pole tips. This is the typical configuration for a multitrack head and, therefore, use may be made of tip plate hard-anodizing to improve head wear life.

Figure 5A:
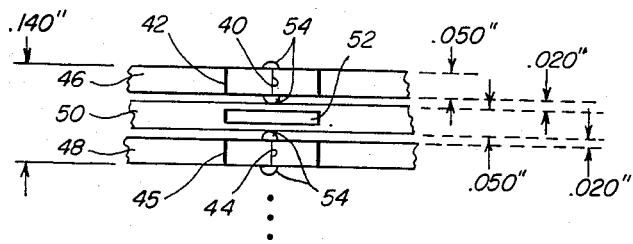
FIGS. 5a and 5b are schematic diagrams useful in explaining certain deficiencies in prior art multitrack magnetic heads.

In the conventional arrangement of 14 interleaved tracks per inch—seven tracks being recorded by a first head and seven tracks being recorded by a second head—each of the tracks, typically, is 0.050 inches wide, the track-to-track pitch of each of the heads being 0.140 inches. See FIG. 5a which shows a first gapped (40) core 42 and a second gapped (44) core 45 of a given multitrack head in the process of recording, respectively, first and second tracks 46, 48 which are 0.050 inches wide. Interleaved with the tracks 46, 48 is a track 50 produced by a second cooperating record head (not shown), the track-to-track spacings between respective pairs of interleaved tracks 46, 48, 50 being 0.020 inches. As indicated, a "thin" shield 52 between the cores 46, 48 rides along the length of the interleaved track 50.

Figure 5B:
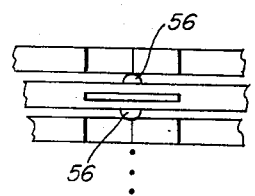

It will be apparent that, while the thin shield 52 between the cores is effective to preclude (to some degree) inductive coupling between the cores 42, 44, the thicker the shield, i.e. more $\mu$-metal and/or copper laminations, the more effective the intertrack shielding will be in reducing electromagnetic coupling. In other words, with the interleaved arrangement of FIG. 5a, downstream playback of the track 50 will result in undesired pickup of the same signal information as was recorded in the tracks 46, 48. In the case of an interleaved playback configuration (See FIG. 5b), fringing flux 56 from an interleaved track can undesirably be sensed by cores cooperating with adjacent tracks and, again, result in undesired crosstalk between signals from the different tracks.

In the interest of precluding reproduce crosstalk between interleaved tracks, it is, or should be, evident that increasing the thickness of the reproduce head shields so that such shields are at least as thick as the recorded tracks are wide will accomplish the intended purpose of precluding crosstalk. In the playback configuration (FIG. 5b) a shield equal to the recorded track width will magnetically short the fringing flux 56 of the interleaved track to preclude undesired pickup by the cores associated with the adjacent tracks.

Figure 6:
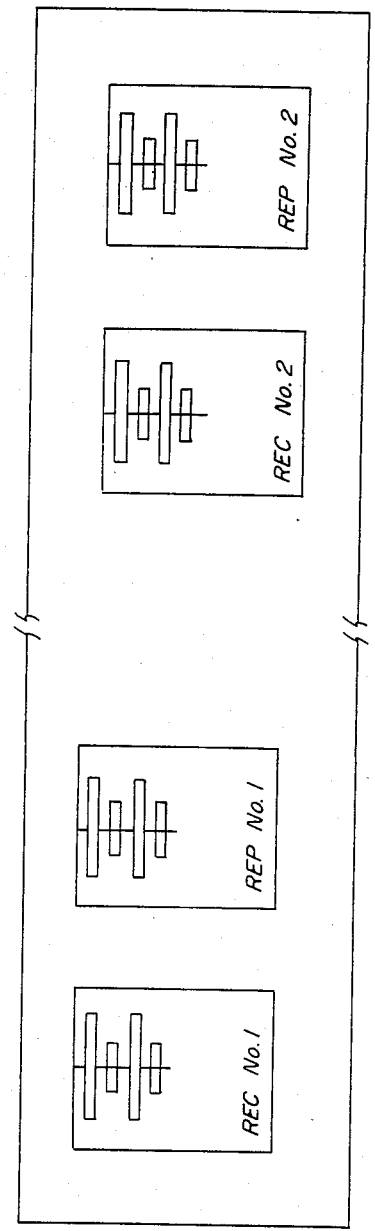
FIG. 6 is a plan view of a magnetic head assembly employing pairs of interleaved record and reproduce magnetic heads according to the invention.

Whereas it has been recognized that the use of shields, which are as thick as interleaved tracks are wide, would improve the electrical performance of multitrack heads arranged in an interleaved configuration, such shields, as discussed above, would tend to nullify the purported long-life advantages of hardened tip plates since they (the shields) would then provide significant support for the cooperating recording medium in question. Attendantly, in the interest of providing both improved wear and electrical properties, thick shields comprising copper-clad Sendust were incorporated, by the inventor hereof, in interleaved multitrack heads. Sendust, being soft magnetically, but hard mechanically, was perceived to be a good (though costly, at about $4.00 per shield) compromise for providing the desired conflicting qualities. While magnetic heads with thick Sendust shields work well in certain instances—say when cooperating record and reproduce heads are remote from each other—their use, as in the "digital" reproduce-while-recording arrangement of FIG. 6, was found to be fraught with a serious problem, viz. undesired radiation of record signals into the cooperating reproduce head. Why this would occur is open to speculation, but one explanation seems to be that the Sendust (being of relatively low resistivity) limits—rather than promotes—the shielding effect of eddy current activity therewithin.

SUMMARY OF THE INVENTION

To reconcile not only the wear/electrical problem, but the radiation problem as well, modified thick shields were fabricated. Each such shield is comprised of a plurality of laminations of magnetically, and mechanically, soft material bonded together into a unitary stack of appropriate thickness. The laminations are typically of $\mu$-metal; and the stacked laminations are provided with copper cladding as is the practice in the art. At the medium-bearing surface of the shield, a cutout is provided; and into such cutout a small insert (chip) of magnetically soft, mechanically hard, material, e.g. Sendust, is provided. The Sendust chip, which costs about $0.50, is electrically bonded to the unitary stack of laminations to prevent the chip from undesirably building up electrical charge. With shields as described in this Summary included in heads forming respective parts of the arrangement of FIG. 6, long head life, good track-to-track signal isolation, and freedom from radiation between record and reproduce heads, are achieved.

DETAILED DESCRIPTION OF THE INVENTION

Figure 7:
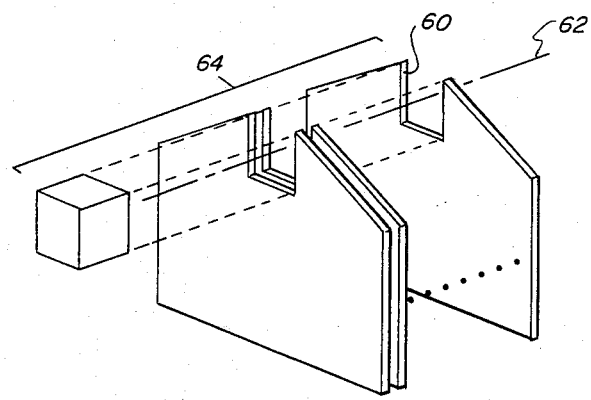
FIG. 7 is a perspective exploded view of a magnetic shield according to the invention.

Referring to FIG. 7, a thick shield according to the invention is made by stacking together an appropriate number of magnetically soft laminations, e.g. of $\mu$-metal, and bonding such laminations together. Copper cladding may be applied to the exterior of the shield and/or between its laminations. Each such lamination is provided with a cutout 60; and so, when the laminations are stacked together, they form a channel 62. In a typical shield for use in the aforementioned 7-track head, the channel would be 0.080 inches wide and about 0.100 inches deep, the overall thickness of the shield being 0.050 inches. Into the channel 62, a chip 63 of magnetically soft but mechanically hard material, e.g. Sendust, is inserted, the Sendust insert being bonded in place by electrically conductive silver epoxy to prevent the insert from floating electrically. Having produced an appropriate number of similar such thick shields, they are individually inserted (FIG. 8) in respective slots 28', 30' of a pair of cooperating half bracket assemblies. Thereafter, the half bracket assemblies, as in the prior art, are bonded together, contoured, wired up, etc., to form a multitrack head as depicted in FIG. 9. (Save for the use of primes, corresponding structures in FIGS. 1, 2 and 8, 9 have similar character notations.)

Since the mechanically hard tips of the shields cooperate with the mechanically hard pole tips to provide support for the magnetic medium that cooperates with the head of FIG. 9, head wear is kept minimal (without need for the hard anodizing of the tip plate). Further, since the tipped shields are as wide as the pole tips, a head (whether for recording or reproducing purposes) as in FIG. 9, when used in an interleaved track configuration, provides excellent isolation among the various interleaved tracks. And, finally, when a head as in FIG. 9 is employed as a recording head, radiation therefrom has been found to be minimal; indeed, such radiation is no greater than occurs in prior art heads employing thin $\mu$-metal shields.

The invention has been described in detail with particular reference to certain preferred embodiments thereof, but it will be understood that variations and modifications can be effected within the spirit and scope of the invention. For example, while the above-described head of FIG. 9 is that of a 7-track configuration, heads with other numbers of tracks per inch may practice the invention as well. In the case, say, of a 14-track head, the track widths and track pitch would be scaled down, respectively, to 0.025 inches and 0.070 inches. Given that shield thickness, per the invention, would be 0.025 inches, this would allow 0.010 inches wide bracket assembly fingers for defining the slots in which the shields sit; and fingers of that size are easily machinable at the current state of the art.

What is claimed is:

1. A long life multitrack magnetic head comprising
   (a) bracket assembly means having slots therein,
   (b) magnetic core means in respective slots of a first grouping of said slots,
   (c) magnetic shields in respective slots of a second grouping of said slots,
   said core means and shields being supported in their respective slots in such a way that said shields and core means have coextensive surfaces adapted to contact simultaneously a magnetic recording medium cooperative with said head, said core means and said shields being of similar thickness, each said shield being respectively comprised of
   (a) a stack of laminations of magnetically and mechanically soft material, said laminations being provided with respective cutouts which are similarly respectively disposed so as to form a channel in said stack thereof, and
   (b) a chip of magnetically soft but mechanically hard material bonded to said stack of laminations within said channel, the thickness of said stack of laminations and the width of said chip being substantially the same.

2. An interleaved assembly of multitrack magnetic heads adapted for cooperation with a recording medium, each said head comprising
   (a) a plurality of magnetic cores of a given trackwise thickness,
   (b) magnetic shields between the magnetic cores and having that same given trackwise thickness
   said heads being so disposed with respect to each other that the shields of one head ride between tracks formed by cores of the other,
   each said shield being comprised of
   (a) a stack of laminations of magnetically and mechanically soft material, the laminations in said stack being provided respectively with aligned cutouts proximate the medium-contacting surface of said shield, thereby to form a channel therein, and
   (b) a chip of magnetically soft, mechanically hard material bonded to said shield within said channel, and being of width that is approximately the same as the thickness of its respective stack of laminations.

* * * * *